United States Patent [19]

Scag

[11] 4,146,105
[45] Mar. 27, 1979

[54] LAWN MOWER
[75] Inventor: Dane T. Scag, Elm Grove, Wis.
[73] Assignee: Wisconsin Marine, Inc., Lake Mills, Wis.
[21] Appl. No.: 796,616
[22] Filed: May 13, 1977
[51] Int. Cl.² .......................................... B60K 17/00
[52] U.S. Cl. ............................. 180/70 R; 180/19 R; 74/242.15 R
[58] Field of Search ................. 180/53 R, 70 R, 19 R, 180/19 S, 19 H; 74/242.15 R, 242.1; 56/11.6

[56] References Cited
U.S. PATENT DOCUMENTS

| | | | |
|---|---|---|---|
| 1,170,611 | 2/1916 | Coulbourn | 74/242.1 R X |
| 2,458,720 | 1/1949 | Mertz | 74/242.15 R |
| 2,566,177 | 8/1951 | Eustis | 74/242.15 R |
| 2,689,620 | 9/1954 | Hainke | 180/19 R |
| 2,760,589 | 8/1956 | Rudman | 180/19 R |
| 2,824,415 | 2/1958 | Frazier | 180/19 H X |

Primary Examiner—Kenneth H. Betts
Attorney, Agent, or Firm—Fred Wiviott

[57] ABSTRACT

A power lawn mower has a drive which includes a pair of pulleys affixed to a shaft which is rotatably supported on a pair of arms which are each mounted at one end for pivotal movement about the axis of the engine power takeoff shaft. The arms are also supported intermediate their ends by rods which are pivotally supported at the lower ends on the rear wheel axles. A belt and a pair of pulleys couple the power takeoff shaft to the pulley shaft. A second pair of belts and pulleys couple the pulley shaft to pulleys affixed to each of the rear wheels.

16 Claims, 3 Drawing Figures

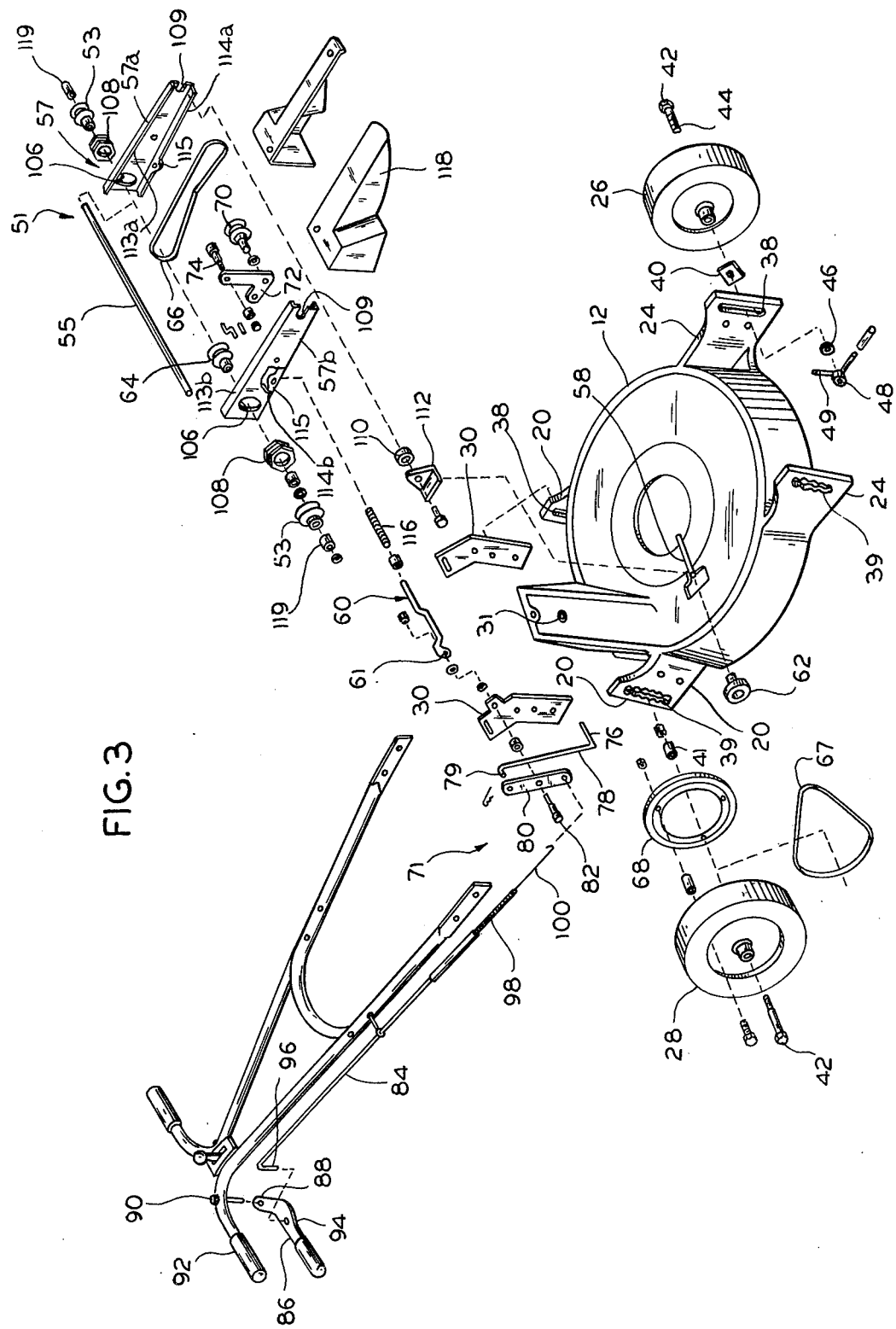

ved rapidly.

LAWN MOWER

BACKGROUND OF THE INVENTION

This invention relates to power lawn mowers, and more particularly to a drive system for power lawn mowers.

Most walk-behind, self-propelled lawn mowers have drive systems which include one or a combination of friction discs, gear boxes, pawl and ratchets, chain and sprockets, or tire friction drives. While such drive systems are suitable for home lawn applications where the mower is used in frequently, they are unsatisfactory for commercial use because these drives tend to wear relatively rapidly.

SUMMARY OF THE INVENTION

It is an object of the invention to provide a new and improved power lawn mower drive system.

Another object of the invention is to provide a power lawn mower drive system which is simple, reliable and is not subject to rapid wear.

Yet another object of the invention is to provide a power lawn mower drive system which is not affected by rear wheel positioning.

A further object of the invention is to provide a deadman clutch for power lawn mowers which does not require a substantial amount of operator tension.

These and other objects and advantages of the present invention will become more apparent from the detailed description thereon taken with the accompanying drawings.

BRIEF DESCRIPTION OF THE DRAWINGS

FIG. 3 is an exploded perspective view of the drive system of the lawn mower illustrated in FIG. 1.

DESCRIPTION OF THE PREFERRED EMBODIMENT

Figure 1:
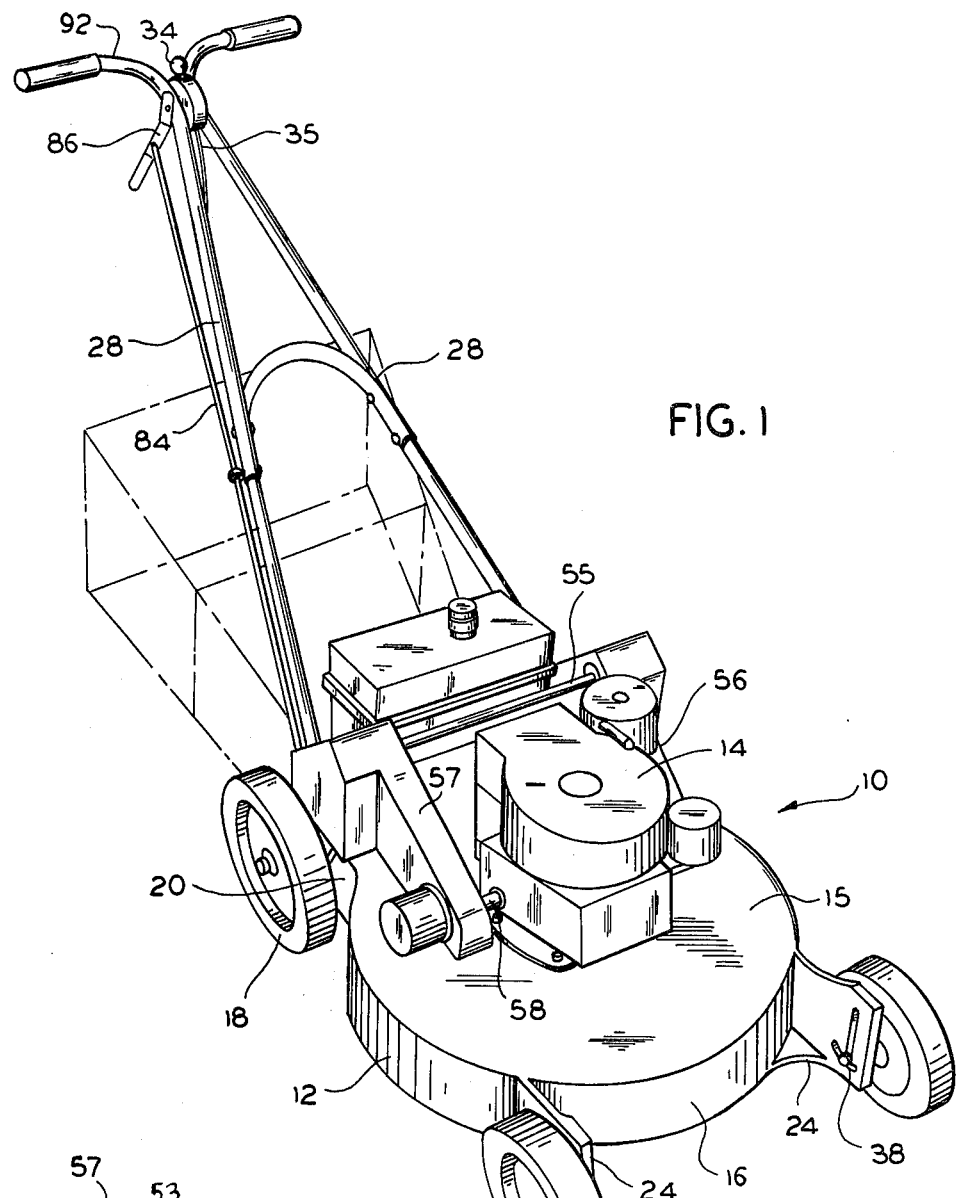
FIG. 1 is a perspective view of a power lawn mower incorporating the present invention.

The power lawn mower 10 illustrated in FIG. 1 includes a mower deck 12 which supports a conventional gasoline engine 14. The deck 12 is an inverted, generally bowl-shaped member having a generally planar upper surface 15 and a depending annular side wall 16. A cutter blade (not shown) is disposed below deck 12 and is connected to a shaft (not shown) extending downwardly on the engine 14. Rear wheels 18 are supported on spaced apart, vertically oriented, generally parallel brackets 20 which are integral with the deck side wall 16 and extend rearwardly therefrom. Similar brackets 24 extend integrally from the front of deck 16 in vertically parallel spaced relation for supporting front wheels 26. A conventional handle 28 is mounted at one end for limited pivotal movement on brackets 30 which are suitably attached to the rear wheel brackets 20 in any suitable manner. A chute 31 (FIG. 3) is formed in the rear of deck 12 and between wheel brackets 20 for directing clippings into a basket. Mounted on handle 28 is a throttle lever 34 which is connected by a cable 35 to the carburetor of engine 14 in a conventional manner. Those components of the mower discussed above are conventional and accordingly, will not be discussed in further detail.

Each of the wheels 18 and 26 are mounted on their respective brackets for vertical movement in any conventional manner. In the preferred embodiment of the invention, a vertical slot 38 is formed in each of the brackets 20 ad 24. Peripheral serrations 39 are formed in each slot 39 at the outer surface of each of the brackets and extending for a substantial portion of the depth thereof for receiving a square shaped nut 40. Each wheel 18 and 26 is rotatively mounted on a bolt 42 having a threaded end portion 44. Each of the bolts 42 extends through the hub of its respective wheel with its end portion 44 threaded into its associated nut 40, the remaining threaded portion passes through slot 38, a washer 46 on the opposite side of the respective bracket and with the distal end thereof threaded into a second nut 48. A V-shaped handle 49 is secured to each nut 48. It will be appreciated that when nut 48 is tight so that nut 40 is retained in the serrated portion of slot 38, the associated wheel is locked in position. However, when the nuts 48 are loosened to free the nuts 40, the wheels 18 and 26 may be moved vertically to reposition the blade (not shown) at a different vertical elevation.

Power is transferred from engine 14 to the rear wheels 18 by means of a belt drive assembly 51 which includes a pair of drive pulleys 53 affixed to a jack shaft 55 rotatably supported adjacent to the ends of a pair of arms 56 and 57. The other ends of each of arms 56 and 57 are pivotally mounted on the opposite side of deck 12 about the generally horizontal axis of a power takeoff shaft 58 which extends horizontally from engine 14. The arms 56 and 57 are also supportingly engaged intermediate their ends on the upper ends of rod 60, the lower ends of which have an eye 61 pivotally received on the wheel spacers 41 of the rear wheels 18.

A power takeoff pulley 62 is affixed to the power takeoff shaft 58 and is coupled by a belt 66 to a power pulley 64 affixed to the jack shaft 55. In addition, one of a pair of drive belts 67 extends from each of the drive pulleys 53 to pulleys 68 affixed to the rear wheels 18. The power takeoff belt 66 is normally slack so that there is no coupling between the power takeoff pulley 56 and the power pulley 62 mounted on shaft 55. Coupling is accomplished by means of an idler pulley 70 which is movable into pressure engagement with the power takeoff belt 66 by means of a control linkage 71. More specifically, the idler pulley 70 is rotatively mounted on the knee of an L-shaped idler crank 72 having one end pivotally mounted on a bolt 74 affixed to arm 57. The other end of crank 72 is coupled to one leg 76 of a Z-shaped control rod 78, the other leg 79 of which is connected to one end of a crank arm 80 pivotally mounted on a bolt 82 secured to bracket 30. A connecting rod 84 connects the other end of crank arm 80 to a control lever 86 pivotally mounted on the handle 28. Lever 86 has an upwardly curved tip 88 which is pivotally mounted by means of a pin 90 adjacent one of the hand grips 92 of handle 28. An aperture 94 is formed in handle 86 for receiving the downwardly directed end 96 of connecting rod 84. A spring 98 is mounted on the other end of rod 84 and has an axially extending hook 100 which is received in an aperture formed in the lower end of crank arm 80.

It will be appreciated that when the control handle 86 is pivoted toward the hand grip 92 to move the connecting rod 84 rearwardly, the crank arm 80 will be rocked clockwise as viewed in FIG. 3. As a result, the control rod 76 is moved toward the right pivoting the idler crank 72 counterclockwise thereby forcing the idler pulley 70 against the unsupported span of belt 66. This tension on belt 66 causes coupling between the power takeoff pulley 62 and the power pulley 64 so that the jack shaft 55 is rotated which in turn drives the rear wheels 18 through the agency of belts 67. When the handle 86 is released, tension in the belt 66 will cause the idler crank 72 to pivot clockwise so that pressure on the belt is released and the power takeoff pulley 56 is uncoupled from shaft 55.

Figure 2:
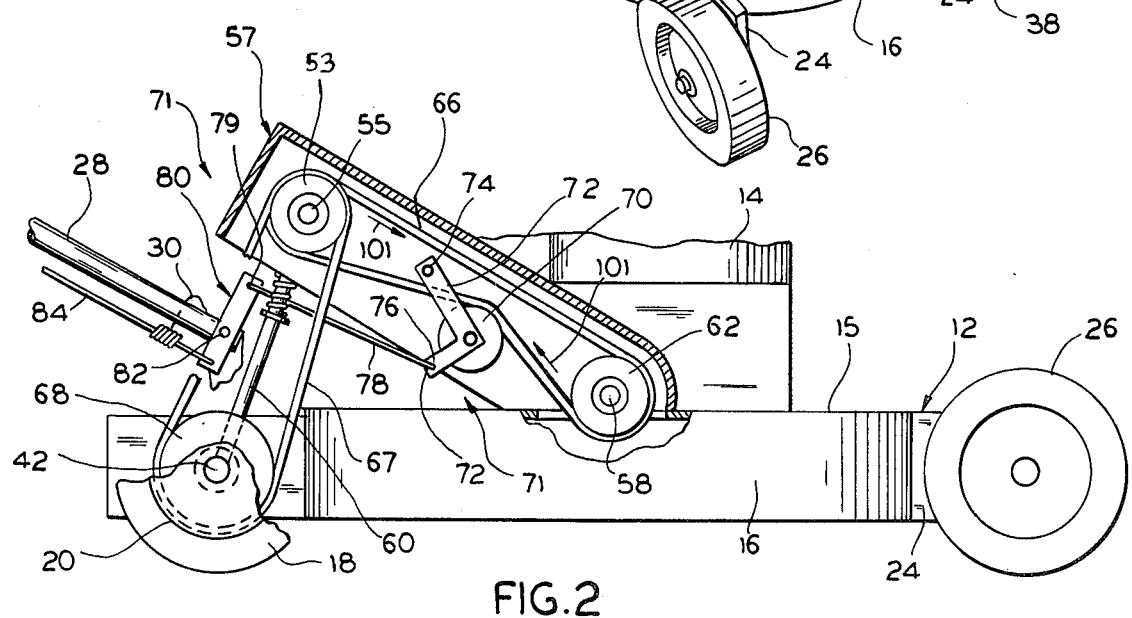
FIG. 2 is a side elevational view of the lawn mower shown in FIG. 1 with parts broken away.

It will be appreciated that for forward motion, the belt 66 will travel in the direction indicated by the arrows 101 in FIG. 2, or in other words, the lower portion moves toward the left. The pulley 70 is positioned below the belt 66 so that when crank 72 is pivoted counterclockwise as viewed in FIG. 2, pulley 70 will move upwardly into engagement with the belt 66. As a result, a peripheral force is applied to pulley 70 by belt 66 at their point of engagement. This force also tends to pivot crank 72 counterclockwise thereby tending to hold the pulley 70 in its engaged position relative to belt 66. As a result, there is a reduction in the force which would otherwise be required by the operator to retain the pulley 70 in its operative position and against the tension force of belt 66 tending to pivot crank 72 in a clockwise direction. Preferably, the crank 72 is arranged such that it is near top dead center when engaged. As a result, the reaction force of belt 66 on pulley 70 acts along arm 72. This minimizes the tension force which must be supplied by the operator in order to hold pulley 70 engaged so as to minimize operator fatigue.

The arm 57 consists of a pair of shaped, elongate, generally triangular shell members 57a and 57b which are suitably joined to form a hollow housing for enclosing the power takeoff pulley 62, the power pulley 64, the power takeoff belt 66 and the upper end of the idler crank 72. The shell members 57a and 57b each have end apertures 106 to permit the jackshaft 55 to pass therethrough. A bearing 108 is mounted on shell member 57 adjacent opening 106 for rotatably supporting the jackshaft 55 to pass therethrough. A bearing 108 is mounted on shell member 57 adjacent opening 106 for rotatably supporting the jackshaft 55 while the drive pulley 53 is mounted on an outwardly extending stub portion thereof. The front ends of the shell members 57a and 57b have C-shaped cutouts 109 which engage a bearing 110 mounted coaxially with the power takeoff shaft 58 on a bracket 112 suitably affixed to the upper surface 15 of deck 12.

Each of the shell members has upper and lower inwardly projecting and overlapping flange portions 113a, 113b, 114a and 114b to facilitate coupling. An aperture 115 is formed at each of lower flanges 114a and 114b for receiving the upper end of a spring 116 affixed to and extending axially from the rod 60. In addition, a housing 118 is mounted on the arm 57a and extends over the drive pulley 53 and the upper portion of the drive belt 67 to prevent an accidental engagement therewith by the operator. The arm 56 is similar to arm 57 except that the former is somewhat narrower since it does not contain the power takeoff drive.

It will be appreciated that because the arms 56 and 57 are supported on rods 60 which are fixed to the bearing pins 42, the arms will pivot about the power takeoff shaft 58 as the rear wheels are adjusted vertically. The jackshaft 55 carried by arms 56 and 57 will similarly move as the arms pivot. However, since the distances between the jackshaft 55 and the rotational axis of the power takeoff pulley 56 on the one hand and the rear wheel pulleys 68 on the other remain the same, vertical adjustments of the rear wheels 18 do not affect the belt drive assembly 51.

The bearings 119 which rotatably support pulleys 53 are preferably unidirectional so that pulleys 53 will drive in the forward direction only. Accordingly, when the mower 10 is turned, the outboard wheel may speed up and free wheel at a higher rotational speed than the inboard wheel.

While only a single embodiment of the invention has been illustrated and described, it is not intended to be limited thereby but only by the scope of the appended claims.

I claim:

1. A power lawn mower having base means, motive means and at least one drive wheel, axle means rotatably supporting said drive wheel on said base means,
   drive means for coupling said motive means to said drive wheel, said drive means including drive shaft means extending from said motive means,
   arm means pivotally mounted on said base means and about the axis of said drive shaft means,
   first torque transfer means mounted on said arm means,
   second torque transfer means mounted on said drive wheel,
   first coupling means for coupling said drive shaft means to said first torque transfer means,
   second coupling means coupling said first torque transfer means to said second torque transfer means,
   and support means mounted on said axle means and engaging said arm means for supporting said first torque transfer means a substantially constant distance from the rotational axis of said drive wheel.

2. The power mower set forth in claim 1 and including clutch means for effecting the connection and disconnection of said first coupling means to said drive shaft means.

3. The power lawn mower set forth in claim 2 wherein said first torque transfer means includes shaft means mounted on said arm means and first and second pulley means mounted on said shaft means, said first coupling means comprising a flexible coupler for coupling the first pulley means to the drive shaft means, said second coupling means comprising a second flexible coupler for coupling said second pulley means to said second torque transfer means.

4. The power lawn mower set forth in claim 3 and including a pair of drive wheels mounted in spaced apart relation on said axle means and each being vertically adjustable relative thereto, said second torque transfer means including a pulley mounted on each drive wheel, said second pulley means comprising a second pair of pulleys mounted on said shaft means and spaced apart approximately the same distance as the pulleys on said drive wheels, said flexible coupler means comprising a pair of belts, one of said belts extending between each pulley on said shaft means and one of the pulleys mounted on said drive wheels.

5. The power lawn mower set forth in claim 4 wherein said support means comprising a pair of rod means each pivotally mounted at one end on said axle means, the other end of each of said rod means resiliently engaging an arm one of said arm means arms.

6. The power lawn mower set forth in claim 5 wherein said drive shaft means extends from said motive means in general parallelism with said shaft means and pulley means mounted thereon, said first coupling means comprising a first belt coupled between said power takeoff pulley means and the first pulley means on said shaft means.

7. The power lawn mower set forth in claim 6 wherein said clutch means comprises crank means pivotally mounted on said arm means, idler pulley means mounted on said crank means, control means for pivotting said crank means toward said first belt to move said idler pulley means into engagement therewith.

8. The power lawn mower set forth in claim 1 wherein said first torque transfer means includes a first shaft mounted on said arm means and first and second torque transmitting means mounted on said first shaft, said first coupling means comprising a flexible coupler for coupling the first torque transmitting means to the drive shaft means, said second coupling means comprising a second flexible coupler for coupling said second torque transmitting means to said second torque transfer means.

9. The power lawn mower set forth in claim 8 and including a pair of drive wheels mounted in spaced apart relation on said axle means and each being vertically adjustable relative thereto, said second torque transfer means including a torque transmitting member mounted on each drive wheel, said second torque transmitting means comprising a pair of torque transmitting members mounted on said first shaft means and spaced apart approximately the same distance as the torque transmitting members on said drive wheels, said flexible coupler means comprising a pair of elongate endless means, one of said endless means extending between each torque transmitting member on said first shaft and one of the torque transmitting members mounted on said drive wheels.

10. The power lawn mower set forth in claim 9 wherein said drive shaft means comprises a second shaft extending from said motive means in general parallelism with said axle means, said arm means comprising a pair of arms pivotally mounted on said means about the axis of said second shaft, said first shaft extending between and being rotatably mounted on said arms.

11. The power lawn mower set forth in claim 10 wherein said support means comprises a pair of rod means each pivotally mounted at one end on said axle means, the other end of each of said rod means resiliently engaging one of said arms.

12. The power lawn mower set forth in claim 11 and including a torque transmitting member mounted on said second shaft, said first flexible coupler comprising a first belt providing an elongate endless means coupled between the torque transmitting member on the second shaft and the first torque transmitting means.

13. A power lawn mower having base means, motor means and a pair of drive wheels rotatably mounted on axle means supported on said base means.
    means for vertically adjusting said axle means relative to said base means,
    drive means for coupling said motor means to said drive wheels, said drive means including a power takeoff shaft extending from said motor means in general parallelism with said axle means,
    arm means pivotally mounted on said base means about the axis of said power takeoff shaft.
    first torque transfer means rotatably mounted on said arm means about an axis generally parallel to said power takeoff shaft,
    second torque transfer means mounted on at least one of said drive wheels,
    first flexible coupling means for coupling said power takeoff shaft to said first torque transfer means and
    second flexible coupling means for coupling said first torque transfer means to said second torque transfer means,
    and support means mounted on said axle means and engaging a preselected portion of said arm means for supporting said first torque transfer means a substantially constant distance from said axle means as said drive wheels are vertically adjusted.

14. The power mower set forth in claim 13 and including clutch means for effecting the connection and disconnection of said first coupling means to said power takeoff shaft, said arm means comprising a pair of arms pivotally mounted on said base means about the axis of said power takeoff shaft,
    said first torque transfer means includes second shaft means mounted on and extending between said arms, and first, second and third torque transmitting members mounted on said second shaft means,
    said second torque transfer means including a torque transmitting member mounted on each drive wheel,
    said first coupling means comprising a first flexible coupler for coupling the first torque transmitting member to the power takeoff shaft, said second coupling means comprising second and third flexible couplers for coupling said second and third torque transmitting members to the torque transmitting members on said drive wheels.

15. The power mower set forth in claim 14 wherein said support means comprising a pair of rod means each pivotally mounted at one end on said axle means, spring means mounted on the other of each of said rod means for resiliently engaging one of said arm means respectively,
    said clutch means comprising idler means and crank means pivotally mounted on one of said arm means and control means for pivotting said crank means toward said first flexible coupler to move said idler means into engagement therewith to cause coupling between said power takeoff shaft and said first torque transfer means.

16. A power lawn mower having base means, motor means and a pair of drive wheels rotatably mounted on axle means supported on said base means,
    drive means for coupling said motor means to said drive wheels, said drive means including a power takeoff shaft extending from said motor means in general parallelism with said axle means,
    first rotary torque transfer means rotatably supported on said base means about an axis generally parallel to said power takeoff shaft.
    second torque transfer means mounted on at least one of said drive wheels,
    flexible belt means for coupling said power takeoff shaft to said first transfer torque means and
    second flexible coupling means for coupling said first torque transfer means to said second torque transfer means,
    clutch means for effecting the connection and disconnection of said first coupling means to said power takeoff shaft and including crank means pivotally mounted adjacent one end, idler pulley means mounted intermediate the ends of said crank means, control means for pivotting said crank means in a first direction toward said belt means to move said idler pulley means into engagement therewith, said idler pulley being positioned for rotating in said first direction when engaged by said belt means to further urge pivotal movement in said first direction, the reaction force of said belt means on said crank means acting in a direction generally parallel to a line extending between the pivot axis of said crank means and the rotational axis of said idler idler pulley when said pulley is in engagement with said belt means, means for vertically adjusting said axle means relative to said base means, arm means pivotally mounted on said base means about the axis of said power takeoff shaft, said crank means being pivotally mounted on said arm means, and support means mounted on said axle means and engaging said arm means for supporting said first torque transfer means a substantially constant distance from said axle means as said drive wheels are vertically adjusted.

* * * * *

UNITED STATES PATENT AND TRADEMARK OFFICE
CERTIFICATE OF CORRECTION

PATENT NO. : 4,146,105
DATED : March 27, 1979
INVENTOR(S) : Dane T. Scag

It is certified that error appears in the above–identified patent and that said Letters Patent are hereby corrected as shown below:

Column 2, line 6, cancel "39" and substitute --38--.

Column 4, line 66, after "arm" (first occurrence), cancel "one"; and after "means," cancel "arms."

Column 5, line 41, after "said" insert --base--.

Signed and Sealed this

Twentieth Day of May 1980

[SEAL]

Attest:

SIDNEY A. DIAMOND

Attesting Officer     Commissioner of Patents and Trademarks